(12) United States Patent
Davis et al.

(10) Patent No.: US 7,472,161 B2
(45) Date of Patent: *Dec. 30, 2008

(54) SYSTEM FOR ENSURING CLIENT ACCESS TO MESSAGES FROM A SERVER

(75) Inventors: James Robert Davis, San Jose, CA (US); Gerald Dean Hughes, Morgan Hill, CA (US); Steve T. Kuo, San Jose, CA (US); Thomas Clarke Morrison, San Jose, CA (US); Jack Chiu-Chiu Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/055,011

(22) Filed: Mar. 25, 2008

(65) Prior Publication Data

US 2008/0172473 A1 Jul. 17, 2008

Related U.S. Application Data

(63) Continuation of application No. 09/808,487, filed on Mar. 14, 2001, now Pat. No. 7,392,282.

(51) Int. Cl.
*G06F 15/16* (2006.01)
*G06F 11/00* (2006.01)

(52) U.S. Cl. .......................................... 709/203; 714/4
(58) Field of Classification Search ................ 709/203, 709/206, 223, 229, 248; 714/4
See application file for complete search history.

(56) References Cited

U.S. PATENT DOCUMENTS 5,140,689 A   8/1992   Kobayashi
5,524,241 A   6/1996   Ghoneimey et al.
5,754,857 A   5/1998   Gadol
5,781,739 A   7/1998   Bach et al.

(Continued)

OTHER PUBLICATIONS

O'Neal, Visual Basic Programmer's Journal, vol. 8, No. 11, Abstract only, Fall 1998.

(Continued)

*Primary Examiner*—Douglas B Blair
(74) *Attorney, Agent, or Firm*—Kunzler & McKenzie

(57) ABSTRACT

The present invention is a system for ensuring client access to paired and unpaired response messages. In the method, the server detects one or more unpaired message which are stored in a data structure on the server. The data structure may be created when the server is staffed or automatically when the first unpaired message is identified. The method then uses a communications protocol between the client and server which allows the client to request on or more of the stored unpaired messages. The system of the-present invention uses a request module configured to receive a client request and prepare the client request for a response generator. The response generator receives the client request from the request module and generates an appropriate response. Next, an unpaired message module analyzes the response message generated by the response generator and distinguishes a paired message from an unpaired message. Then, the unpaired message module stores paired messages in an unpaired response data structure. Finally, a response module communicates paired and unpaired messages to the client.

13 Claims, 3 Drawing Sheets

U.S. PATENT DOCUMENTS

| | | |
|---|---|---|
| 5,850,517 A | 12/1998 | Verkler et al. |
| 6,058,389 A | 5/2000 | Chandra et al. |
| 6,154,848 A | 11/2000 | Igarashi et al. |
| 6,269,402 B1 | 7/2001 | Lin et al. |
| 6,438,592 B1 | 8/2002 | Killian |
| 6,493,764 B1 | 12/2002 | Aldred et al. |
| 6,718,376 B1 | 4/2004 | Chu et al. |
| 6,877,036 B1 | 4/2005 | Smith et al. |
| 6,965,904 B2 | 11/2005 | Bankert et al. |
| 7,392,282 B2 * | 6/2008 | Davis et al. ................. 709/203 |

OTHER PUBLICATIONS

"Technical Note—IMS celebrates thirty years as an IBM product" Blackman, K.R., Systems Journal, vol. 37, No. 4, IBM, 1998. http://www.research.ibm.com/journal/sj/374/blackman.html.

\* cited by examiner

SYSTEM FOR ENSURING CLIENT ACCESS TO MESSAGES FROM A SERVER

CROSS-REFERENCES TO RELATED APPLICATIONS

This application is a continuation of and claims priority to U.S. patent application Ser. No. 09/808,487 entitled "System and Method for Ensuring Client Access to Messages from a Server" and filed on Mar. 14, 2001 now U.S. Pat. No. 7,392,282 for James Robert Davis, which is incorporated herein by reference.

BACKGROUND OF THE INVENTION

1. Field of the Invention

The present invention relates to client-server application network communications. More specifically, the invention relates to managing client-server communications such that a client has access to all messages from a server.

2. Relevant Technology

Programmed computers are increasing modern day society's ability to do more work in less time and at less expense. The programs which execute on these computers cover a vast range of subjects and industries. These programs vary in their amount of utilization of computer hardware resources. In the end, it is the output of the computer such as, a report, a display, a printed document, and the like which provides the utility found in programmed computers.

Programs for computers may be a single program executing on one computer or a plurality of program modules distributed across a plurality of individual computers. Division of a single program into modules may be done for several reasons such as to protect ownership of a particular module, to save computer resources, or to broadly increase user access to specific program modules.

Division of a single program into program modules requires there be some form of communication rules or relationships between the program modules and hardware to transmit the communications. The relationships available are varied and often model the relationships amongst human beings. Examples of models include peer to peer, master/slave, and client/server. In each model, one program module takes on one role and a second program takes on the other role.

The hardware needed to transmit inter-program module communications is standard computer networking hardware which utilizes standard network protocols, e.g., ISO/OSI, IPX, SNA, OTMA, APPC, TCP/IP, to pass messages from one program module to the other. In addition, each computer on the network needs a network card capable of communicating across the network medium. The network medium may be Ethernet, token-ring, twisted pair, infrared, radio waves, other wireless mediums and the like. The network may be a local area network LAN, wide area network WAN, or global network such as the Internet.

Inter-program module messages contain two kinds of data, control data and message data. Depending on the network protocol, there may be one or more layers of control data. The control data instructs the network hardware how and where to transmit the message. The message data is the information the sending computer intended to transmit. Some protocols, such as Open Transaction Message Access ("OTMA"), provide a portion of the control data which either program module may use to identify messages.

Of the models for inter-program module relationships, the client/server model is most prevalent. Client-Server programs are common in most every aspect of government, business, and commerce today. The development of the Internet has magnified the importance, growth and the reliance on the client/server model.

A client/server program consists of a client program module, referred to hereinafter as a client, assuming the role of a client. The client communicates with a server program module, referred to hereinafter as a server, assuming the role of a server. A client, as in real life, requests certain services of the server. A server, again as in real life such as a butler, performs the services requested by the client. In a client/server model, generally the server executes on one computer while the client executes on a remote computer which is connected to the server by a network. While this is not necessary, executing the client and the server on the same computer limits the advantages gained by doing otherwise. In order for most advantages of a client/server model to be gained, the time required for a server to meet the client request must be short. A client request which monopolizes the server and its resources moves from a client/server model to a master/slave model.

The client/server model has distinct advantages. First, a single server may service multiple clients almost simultaneously. Second, the server may act as a central repository for data files, database records, web pages, email data, and the like. Additionally, the server may execute on a computer which has many more computing resources such as disk space, memory, and computing speed than the computer on which the client executes. Centralizing the computing resources allows the server to execute complex or time consuming calculations on a client's behalf. A single client may not need the extra computing resources at any given time but may need the resources at a later point during a given time interval. Thus, centralizing the resources and allowing multiple clients access to them by way of a server maximizes the use of these resources.

An example of a server which provides primarily database records to clients is a database management system. An example of a database management system is the Information Management System (IMS™) available from IBM Corp., Armonk, N.Y. The IMS system is used to serve records from a vast number of databases in operation today. The IMS system[s] allows access by clients to one or more databases in order for users to retrieve and modify the data maintained on the database. The majority of client access involves transactional operations.

A client/server model offers advantages in the design and programming of clients as well. In the design of the client and the server the software engineer may decide how much functionality to place in the client versus the server. Generally, functionality which maximizes computing resources is placed in the server. This functionality is often database records and their management or complex computing algorithms. This leaves primarily output and server request functionality for the client. Output functionality includes displays, reports or other human intelligible computer outputs. Clients with little more than output functionality are called thin clients. Thin clients require less computing resources on the remote computer. This allows the thin client to execute on a smaller, more compact computing device such as a Palm Pilot® or internet enabled mobile phone. A thin client also allows the client to be generalized such that the client may execute as a plug-in within a client driver program, such as Netscape® or Microsoft Internet Explorer®. Using thin clients also allows the program designer to protect proprietary algorithms on the server while still providing the service to the clients.

As mentioned above, the client/server model is most effective with transactional operations of short duration. In transactional operations, the client requests a service such as the data in a database representing a person's bank account balance. The transaction is complete when the server responds to the client with a response message containing the balance amount.

One premise generally relied on when using network protocols is that for each client request made of the server there will be a corresponding response sent to the client. Even if the response to the client is that the server experienced an error or could not service the request, the client expects at least some response message. Similarly the server anticipates that the client expects a response and makes arrangements to provide one. A protocol for use with the present invention, Open Transaction Message Access ('OTMA'), also relies on this premise. Response messages are stored in a data structure until the server is capable of sending them. Suitable data structures include, queues, linked lists, and the like.

During normal operation, the premise of expected response messages functions without any problems. Clients make requests using request messages and the server responds using response messages. A completed transaction is a request and its corresponding response message. A request and its corresponding response message comprise as a set of paired messages. The server response message is the pair for the client request message.

Unfortunately, operations between computers on a network are not completely free from communication interruptions. Interruptions may take various forms. The client may make a request and be taken off the network, or off-line, by the user of the client computer before the server could deliver the response to complete the transaction. Alternatively, the client may request a server perform a service and send the result to a second client which is not currently on-line.

Conventional servers ignore interruption scenarios. The server continues to store response messages in the queue and continues servicing other clients. Messages which have become undeliverable because of an interruption are called unpaired messages. The module in the server responsible for delivering the server responses continues to send out responses to clients currently connected to the server. A client is connected when it has indicated a desire to communicate with the server and the server has accepted to perform services for the client.

When communication has been prematurely interrupted, unpaired messages may accumulate in the server's message response queue. Once the same client re-connects to the server, the client may send the same request as prior to the interruption or send a completely different request. However, messages sent from the server to the client are sent on a first in, first out (FIFO) basis. That is the first message to be stored in the queue will be sent before subsequent messages stored in the queue. Therefore, the server sends, in response to the client's most recent request, the unpaired response message created in response to the last request prior to the interruption.

Because server response messages are sent on a FIFO basis client1 may request a service and ask that the response be sent to client2. At about the same time, client2 has made a completely different request. The request from client1 is quickly processed and a response to be delivered to client2 is placed in the queue. Then, client2's response is ready. Conventional server message delivery modules do not distinguish between paired and unpaired messages. The message for client2 from client2 is an unpaired message which the conventional delivery module simply sends to client2. Because this response is not the pair for the request client1 made, an error condition in client2 may result.

Some clients may have logic to enable the client to recover from an interruption and identify the unpaired response message sent by the server and work through the problem accordingly. However, most clients do not have such logic. These clients are expecting a response to their most recent request and instead are receiving an unpaired message. This mismatch, or disconnect in communication may lead to the client experiencing an error state or outputting erroneous data.

Solutions to the response message mismatch generally involve developing clients which have logic to manage unpaired messages. This logic increases the size of the client executable meaning the clients will require more computing resources. The computing resources required lowers the probability that the advantages of thin clients, mentioned above, can be recognized. Also, placing this logic in the client may require separate logic to handle unpaired messages from each server a client may interact with.

Thus, it would be an advancement in the art to provide a system to manage unpaired messages such that unpaired messages may be utilized by the clients even after a communications mismatch. It would be a further advancement to provide a system to manage unpaired messages in a single central server location rather than in each remote client. It would be a further advancement to provide unpaired message management without increasing the size of the clients. It would be yet another advancement in the art to provide unpaired message management by using existing server functionality rather than consuming additional client computer resources. It would be yet another advancement in the art to provide a system for managing unpaired messages such that the system may be initiated by a client's request. It would be yet another advancement in the art to provide a system for managing unpaired messages to recognize the existence of unpaired messages and automatically manage these messages for later delivery to the client. It would be yet another advancement in the art to provide a system for managing unpaired messages such that the client may request one or more unpaired message be sent to the client. Such an invention is disclosed and claimed herein.

SUMMARY OF THE INVENTION

The invention is a system for ensuring client access to unpaired messages from a server. The system includes a server detecting at least one unpaired message intended for a client and storing this message in a data structure. Subsequent unpaired messages intended for this client are also stored in the data structure. The system further includes use of a communications protocol between the client and server. The protocol allows the server to notify the client when the client has pending unpaired messages. The client, using the protocol, requests at least one unpaired message stored in the data structure. The data structure storing the unpaired messages may be created statically upon an initialization event within the server or dynamically upon the existence of the first unpaired message.

The system of the present invention further includes a request module, a response generator, an unpaired message module, and a response module. Requests from the client for one or more unpaired messages are passed directly from the request module to the response module. All other requests are passed to the response generator.

The response generator is a general purpose module which is capable of creating a general or specific response to a client's request. The response generated by the response generator is analyzed by the unpaired message module. The unpaired message module is configured to distinguish between paired and unpaired messages. The unpaired message module may be configured to automatically create an unpaired message queue when a first unpaired message is encountered. The unpaired message module stores unpaired messages in the unpaired message queue and stores all other paired messages in a paired message queue. These queues may be within the response module.

The response module communicates responses from the server to the client. In normal operation, the response module sends messages in the paired message queue to the client in the order in which the messages were created. But, if the request module indicates the client wants one or more unpaired messages, then the response module sends the corresponding number of unpaired messages from the unpaired message queue to the client. If there are no messages in the unpaired message queue then the response module may destroy an existing unpaired message queue related to that client. When the first unpaired message is stored in the unpaired message queue, the client sets an unpaired messages waiting indicator in subsequent paired messages to the client to indicate there are unpaired messages for this client in the unpaired message queue.

By using an unpaired message module and an unpaired message queue within the response module many advantages are obtained. First, a client which goes off-line and loses communication with the server, is not confused by unpaired messages which the client may not have been expecting or configured to handle. This means a server implementing the present invention may interact with sophisticated and simple clients. Second, the unpaired message queue may be created dynamically. This saves resources in the server. And third, the client controls whether unpaired messages are sent, the number that are sent, and whether a properly configured server utilizes the system.

These and other features and advantages of the present invention will become more fully apparent from the following description and appended claims, or may be learned by the practice of the invention as set forth hereinafter.

BRIEF DESCRIPTION OF THE DRAWINGS

These and other more detailed and specific objects and features of the present invention are more fully disclosed in the following specification, with reference to the accompanying drawings, in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the system of the present invention, as represented in FIGS. 1 through 3, is not intended to limit the scope of the invention, as claimed, but is merely representative of presently preferred embodiments of the invention.

Figure 1:
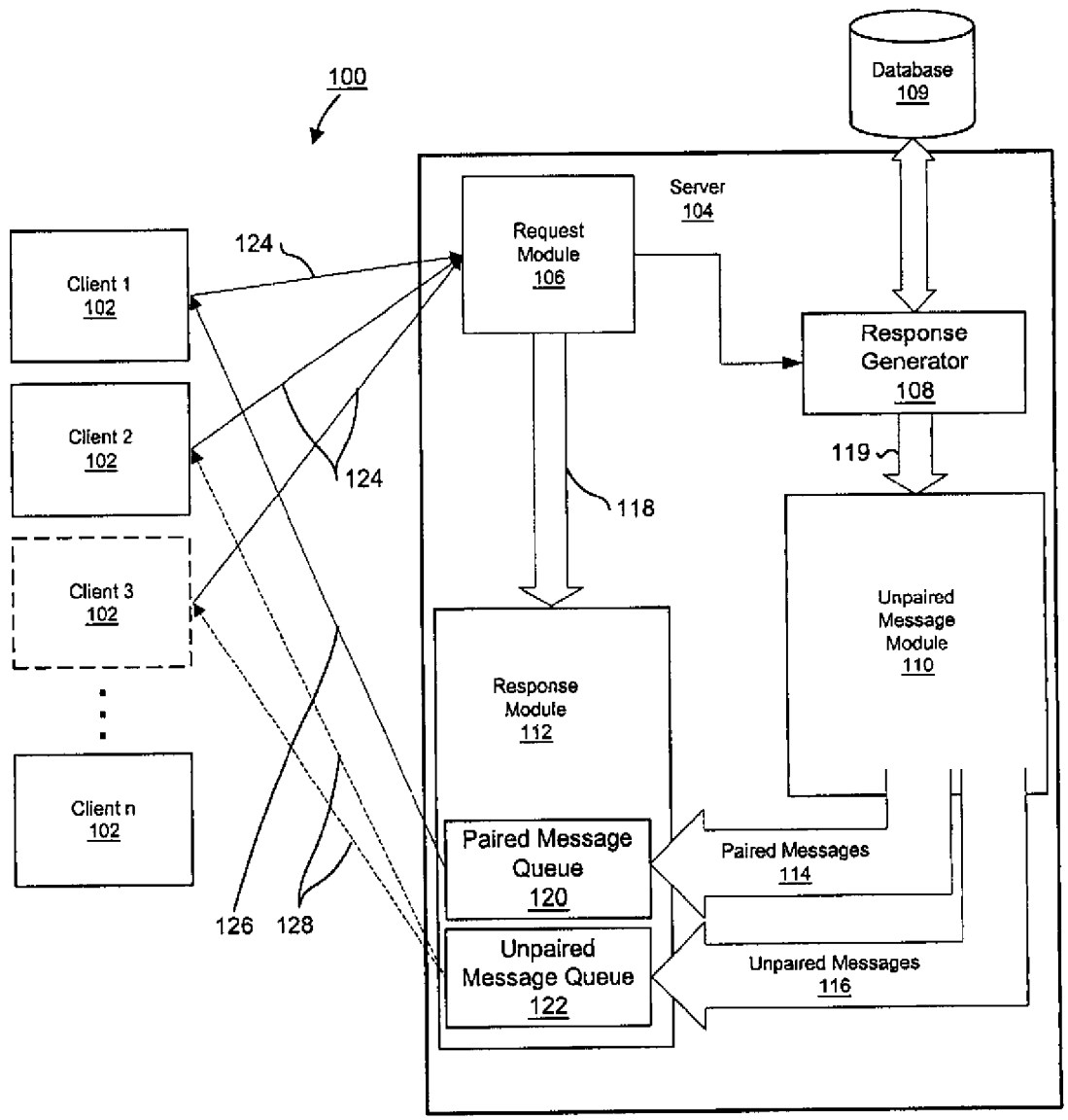
FIG. 1 is a block diagram of a server computer system in communication with a client computer system suitable for implementing one embodiment of the invention.
Figure 2:
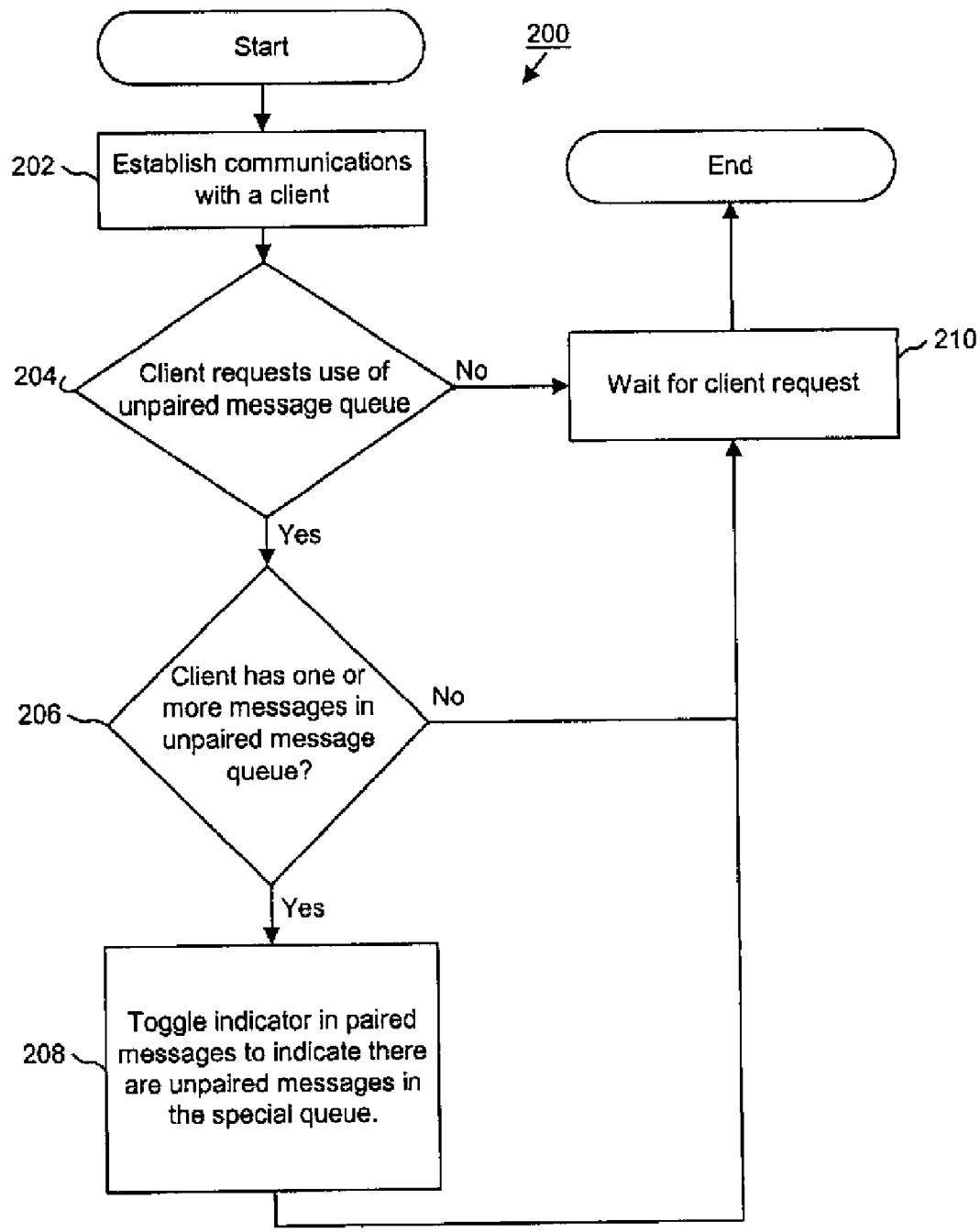
FIG. 2 is a flow diagram of one embodiment of a method for communicating between a client and a server at connection time such that unpaired messages may be delivered to the client.
Figure 3:
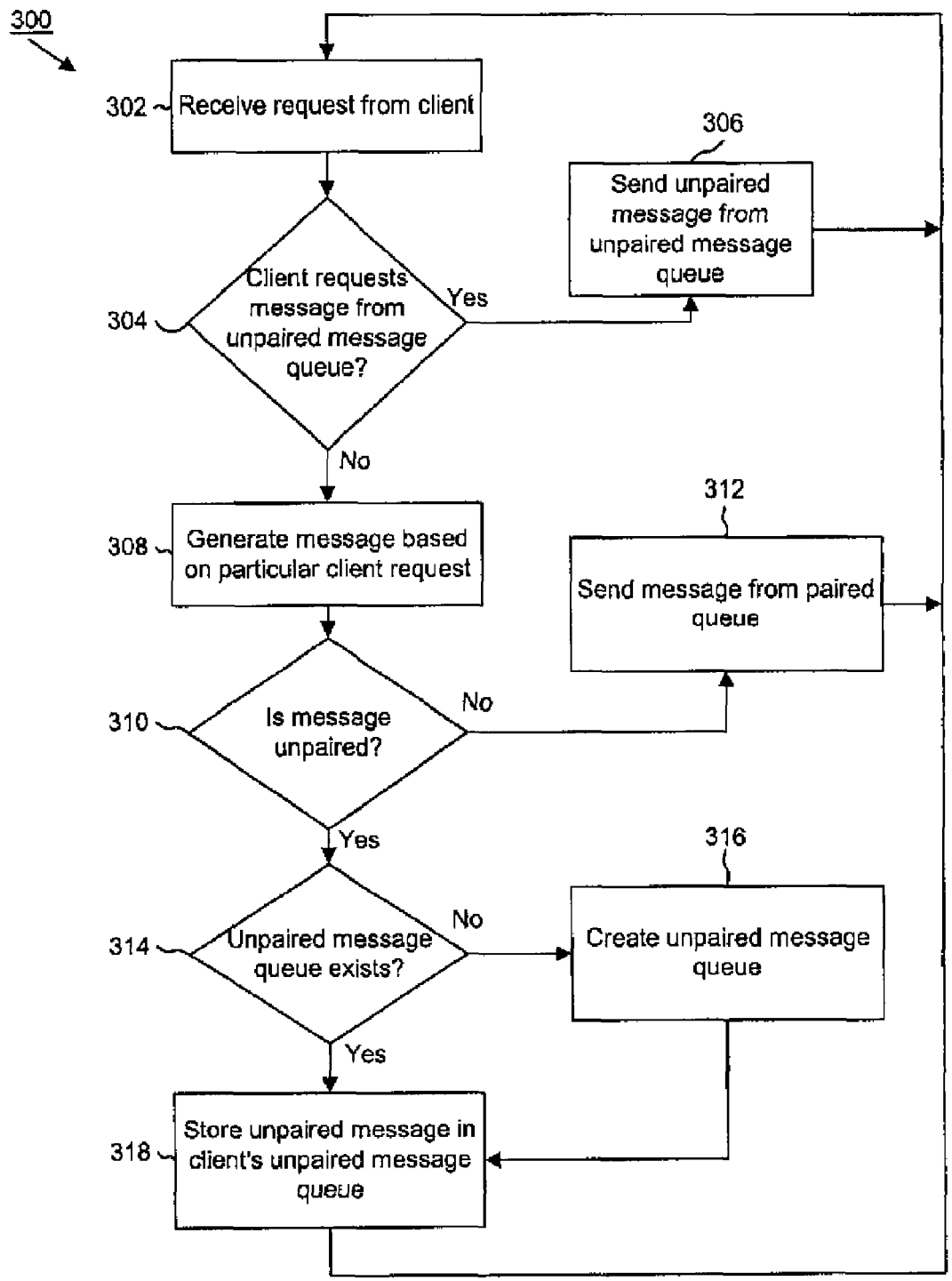
FIG. 3 is a flow diagram illustrating one embodiment of a method for ensuring a client has access to messages from a server.

FIGS. 1 through 3 are a schematic block diagram and flow chart diagrams which illustrate in more detail certain embodiments of software modules and steps for carrying out the present invention.

FIG. 1 is a schematic block diagram which illustrates an unpaired message access system 100 in which a client 102 and a server 104 are connected and configured in such a way that unpaired messages may be accessed by the client 102. The clients 102 are designated client 1 to client n to indicate a plurality of clients 102 which may be connected to the server 104 at any given time. A connection with the server 104 may be a conventional network connection by way of a network, a LAN, a WAN or an interconnected system of networks, one particular example of which is the Internet and the World Wide Web supported on the Internet. A connection includes an authorization by the server 104 to accept requests from a particular client 102 when such requests are sent through the network.

The clients 102 are computer programs of various configurations operating on various kinds of computers. Some clients 102 may be database reporting programs, data management programs, financial transaction programs, and the like. These clients 102 may vary in their sophistication. Some may be simple database queries. While others may be complex financial programs which include logic to manage unpaired messages resulting from a lost network connection, or communication mismatch with the server 104.

The present invention allows the server 104 to communicate with both simple and complex clients 102. Each client 102 is configured to initiate a connection with the server 104 and conduct transactions with the server 104 once a connection is established. Transactions are comprised of a service request made of the server 104 by the client 102 and a response sent to the client 102 by the server 104. The response corresponding to a request is a paired message, as discussed above. An unpaired message is a response which would be unexpected by the client 102.

Requests of the clients 102 are serviced by the server 104. As discussed above, a server 104 exists to service requests of clients 102. Of the various services which a server may be programmed to provide, one is database management system ('DBMS'). An example of a database management system within the scope of the present invention is IMS, described above. A DBMS is a good example of a server 104 which interacts with its clients 102 generally on a transactional basis. A request from the client 102 is received by the server 104 and both the server 104 and the client 102 expect a response will be sent to the client 102 to complete the transaction.

A server 104 within the scope of the present invention includes a request module 106, a response generator 108, an unpaired message module 110, and a response module 112. The request module 106 receives client requests 124, performs initial processing of the requests 124, and routes the requests 124 to the appropriate subsequent module. Client requests 124 are communicated by way of the network. The client 102 utilizes a network communications protocol, such as OTMA, to send a request 124 to the request module 106 within the server 104. When the server 104 is a DBMS such as IMS, the requests 124 may ask the server 104 to report or modify particular database records. Following each request 124, the client 102 waits for a response or acknowledgment that the service was successfully performed by the server 104.

The request module 106 is configured to receive two different kinds of requests If the request is that unpaired messages 116 be sent to the client 102 then the request is an unpaired message control request 118 which is sent to the response module 112. All other requests 124 which the server is programmed to respond to are sent to the response generator 108.

The response generator 108 serves to execute internal functionality to service the requests 124. Requests 124 are instructions to perform a service and includes things like: "What is the checking account balance for account #12345678?", or "Please increase the checking account balance for account #87654321 to $300.00." Once the service is performed, the response generator 108 creates a response appropriate to the particular request. Example responses may include: "Checking account balance for account #12345678 is $500.00.", or "Balance for checking account #87654321 successfully increased to $300.00." Once a response is generated, it is passed to the unpaired message module 110.

The unpaired message module 110 contains logic to determine for each given response whether the response is a paired message 114 or an unpaired message 116. The main question which determines whether the response is a paired or unpaired is: "Has something happened in communications between this client 102 or another client 102 and the server 104 such that sending this response as the next response to the client 102 will result in the client 102 receiving a response which it did not expect?" Various status data concerning communications between the clients 102 and the server 104 are used to answer this question. An affirmative answer to the question indicates that the response is an unpaired message 116 and a negative answer means the response is a paired message 114.

In normal operation, a client may make numerous requests 124 of a server 104. Each request 124 results in a corresponding response 126. Requests 124 are not always responded to in the same amount of time. Some responses 126 to early requests 124 are generated following responses 126 to requests 124 received later in time. The unpaired message module 110 also identifies these situations and orders a client's 102 responses such that they are sent to the client 102 in the order the client 102 expects them. These ordered responses 126 are stored in a paired message queue 120. The paired message queue 120 is a data structure which stores the paired messages 114 in a FIFO order, described above. The data structure with appropriate logic may take the form of queues, linked lists, and the like.

Upon identifying an unpaired message 116, the unpaired message module 110 may create a second data structure similar to the paired message queue 120 which is called an unpaired message queue 122. The unpaired message queue 122, like the paired message queue 120, stores the messages in FIFO order. Once unpaired messages 116 and paired messages 114 are stored in the message queues, they are managed by the response module 112.

The response module 112 communicates responses, both paired 126 and unpaired 128 to the appropriate client. For each response 126/128 there is an identifier to indicate to the client 102 which is to receive the response 126/128. During normal operation, the response module 112 takes the paired message 114 which was stored first and sends it to the appropriate client 102. If there are unpaired messages 116 stored in the unpaired message queue 122 for this particular client 102, then the response module 112 will modify an unpaired messages waiting indicator (not shown) in all paired messages sent to the client 102. The unpaired messages waiting indicator allows the client 102 to identify when the server 104 has unpaired messages 116 for the client 102. If the response module 112 receives an unpaired message control request 118 from the request module 106 to send one or more unpaired messages 116 to a particular client 102, then the response module 112 will meet the unpaired message control request 118 before sending more paired messages 114 to the particular client 102.

In order to understand the features and advantages of the present invention, three scenarios are presented all in reference to FIG. 1. First, normal operation is illustrated by the communication between client 1 (102) and the server 104. Client 1, after establishing a communications connection with the server 104, sends a request 124 to the server 104. The request is simply a general database request such as "What is the first name of the person in the name table of the database?" The request module 106 receives the request 124 and recognizes it as a normal request. The request 124 is sent to the response generator 108. The response generator 108 retrieves from the database 109 the desired information and packages the data in a response 119. The response 119 is then sent to the unpaired message module 110 which detects that sending this response 119 as the next message to client 1 will be expected by client 1. Therefore, the unpaired message module 110 identifies the message as a paired message 114 and stores it in the paired message queue 120 within the response module 112. The response module 112 then communicates the paired message response 114 to client 1 (102) by way of paired message response path 126. Client 1 then receives the paired message response 114 and continues its normal operation.

In the second scenario, mismatched request 124 and response 126/128 messages are illustrated in FIG. 1. Here, client 1 (102) sends a request 124 to the server 104 just as described in the first scenario. However, the request 124 indicates that client 2 is to receive the response 119. The steps within the server 104 until the response 119 enters the unpaired message module 110 are the same as before. When the unpaired message module 110 reviews the response 119 the unpaired message module 110 recognizes the response 119 as an unpaired message 116. This is an unpaired message 116 because subsequent to client 1's (102) request, but prior to sending client 1's (102) response 119 to client 2 (102), client 2 (102) has requested a service of the server 104. Therefore, sending the response 119 generated by the request from client 1 (102) to client 2 (102) prior to the response 119 for client 2 (102) generated by the request from client 2 (102) causes client 2 (102) to receive an unexpected response 119. Client 2 is expecting a response 119 to client 2's (102) request 124. The response to client 2 (102) generated by the request from client 1 (102) is an unpaired message 116.

The unpaired message module 110 recognizes there is no unpaired message queue 122 in the response module 112. The unpaired message module 110 creates a new unpaired message queue 122. The unpaired message module 110 then stores the unpaired message 116 in the unpaired message queue 122. Later, the unpaired message module 110 receives from the response generator 108 the response 119 which matches the request from client 2 (102). This response 119 is a paired message 114 and is stored in the paired message queue 120. Because an unpaired message 116 exists in the unpaired message queue 122, the response module 112 sets an unpaired messages waiting indicator in each paired message 114 sent to client 2 (102). This allows client 2 (102) to recognize there are unpaired messages 116 waiting on the server 104. When no unpaired messages 116 exist, the unpaired messages waiting indicator is not set.

Next, client 2 (102) may decide to request one or more of the unpaired messages 116. Client 2 (102) sends an unpaired message request to the server 104. The request module 106, then sends an unpaired message control request 118 to the response module 112. The response module 112 responds by sending the requested number of unpaired messages 116 in the unpaired message queue 122 to client 2 (102). Communication of the unpaired messages 116 is illustrated by the dashed lines 128 between the unpaired message queue 122 and client 2 (102) and client 3 (102). Once the requested number of unpaired messages 116 are sent or the unpaired message queue 122 is empty, the response module 112 resumes sending paired messages 114 to client 2 (102). If the unpaired message queue 122 is empty then the response module 112 destroys the unpaired message data structure so use of computing resources on the server 104 is maximized.

In the third scenario, a client 102 may issue a request 124 to the server 104 and become disconnected and then issue a different request 124 to the server 104. In this case, client 3 (102) issues a request 124 to the server 104. Processing of the request continues as normal. While the response generator 108 works on the response, client 3 (102) loses its connection with the server 104. This is illustrated by the dashed line forming the box around client 3 (102). Loss of connection may occur for various reasons including severing of the network line between the client 3 (102) and the server 104, or termination of the connection by a user operating client 3 (102). After losing the connection, client 3 (102) re-connects to the server 104. Then, client 3 (102) makes a new request 124 which is different from the last. Delivery of the response 119 to the previous request 124 may confuse client 3 (102) or mislead the user.

The unpaired message module 110 recognizes this and identifies the response 119 to the previous request 124 as an unpaired message 116. Storage and notification by the response module 112 then occurs as in scenario 2. A request 124 from client 3 (102) and fulfillment of the request 124 for these unpaired messages 116 occurs in the third scenario in the same way as in the second scenario. The difference is the unpaired message 116 was created due to a client 3 (102) request 124, rather than another client's request.

FIG. 2 illustrates the initial connection process 200 of the present invention. In a client/server model the client 102 generally initiates the communications. In FIG. 2, at step START both the client 102 and the server 104 are executing normally on one or more computers. The client 102 has initiated communications.

In step 202, the client 102 and the server 104 establish their communications connection. Communications between a client 102 and a server 104 are carried out once the two systems have agreed upon a communication protocol and have agreed to accept and send data to each other. Establishment of communications between servers 104 and clients 102 is well known in the art.

Next, in step 204, the client 102 may request that the server 104 use unpaired message tracking to ensure the client 102 has access to all server responses 126/128. Alternatively, unpaired message tracking may be available to all clients 102, at all times. If the client 102 requests use of unpaired message tracking, then the server 104 would configure itself to provide unpaired message tracking to the client 102. This is done by setting server side program variables such that software implementing the present invention will be utilized. If no request is made, then the server 104 would respond to client 102 requests in a conventional manner. Also, if no request is made, the process proceeds to step 210.

In step 210, the server 104 has completed initial preparations to communicate with the particular client 102. The client 102 is connected. The server 104 now waits for any requests 124 from this or any other connected client 102. Following step 210 is the END step. This step illustrates that the establishment of communications step with a particular client 102 is completed. The server 104 then operates as normal, servicing new requests and accepting new client connections.

If the client 102 requests use of unpaired message tracking, then the process continues to step 206. In this step, the server 104 uses the response module to 112 to determine whether there are unpaired messages 116 in the unpaired message queue 122. If so, then the process continues to step 208. If there are no unpaired messages 116, then the process proceeds to step 210, discussed above.

In step 208, the server 104 toggles an unpaired messages waiting indicator in each paired message 114 for this client. When these paired messages 114 are sent to the client 102, the client 102 is able to identify there are unpaired messages 116 waiting on the server 104. The indicator allows the client 102 to determine whether to request unpaired messages 116 from the server 104. Following the toggling of the unpaired messages waiting indicator, the process proceeds to step 210.

FIG. 3 illustrates in flow chart form how the process of the present invention operates. One advantage of the present invention is that all changes to the normal process of client/server transactions are made to the server 104. Therefore, FIG. 3 illustrates the process steps from the perspective of the server 104. Note that FIG. 3 illustrates no START or END step. Although the server would need to be started and stopped in its execution on a computer, FIG. 3 illustrates the process of the present invention at the point at which the server 104 has been started and is prepared to receive client requests 124. This is the request handling process 300.

The request handling process 300 is a cycle and ends only when there is a software or hardware failure in the server 104 or the server 104 is shutdown by a user. For purposes of discussion, the process begins in step 302.

Part of step 302 is the server 104 waiting for a request 124 from a client 102. Waiting for a request requires that the communications connection process of FIG. 2 be completed. When a client request 124 is received by the server 104, the process moves to step 304.

In step 304, the server 104 determines whether the client request 124 is a request to receive unpaired messages 116 or a general services request of the server 104. If the request 124 is a general services request, then the process moves to step 308. If the request is for unpaired messages then the process moves to step 306.

A request for unpaired messages may be of several types. The request may be that all unpaired messages 116 in the unpaired message queue 122 automatically be sent to the client 102. Alternatively, the client 102 may request a single unpaired message 116 be sent. Alternatively, the client 102 may request that the first unpaired message 116 be sent and that all subsequent unpaired messages 116 be automatically sent to the client 102. The server 104 is configured to send unpaired messages 116 to the client in accordance with the particular type of request made.

In step 306, depending on the type of unpaired message request, the response module 112 sends one or more of the unpaired messages 116 to the client 102 from the unpaired message queue 122. Following step 306, the server 104 has completed the desired request. Therefore, the process returns to step 302 where the server 104 waits for the next request from this or any other connected client 102.

In step 308, the server 104 has not received a request for unpaired messages 116. This means the request is a normal service request 124. To service this request 124, the server 104 uses the response generator 108 discussed above. The flow of the response 119 follows the process discussed in relation to FIG. 1.

Step 310 illustrates the determination step which the unpaired messages module 110 of the server 104 must make. Logic for determining whether the response 119 is paired or unpaired resides mainly in the unpaired message module 110. If the message is a paired message, then the process moves to step 312. If the message is an unpaired message, then the process goes to step 314.

In step 312, the paired message 114 is stored in the paired message queue 120. This step includes delivery of paired messages 114 to the client 102. Messages for the client 102 may accumulate in the paired message queue 120 or the unpaired message queue 122 because the server 104 must alternate time using the CPU of the computer between the plurality of tasks which the server 104 must perform. Because work by the server 104 takes time, messages may accumulate in either queue. The message queues 120 and 122 accommodate this accumulation. Following step 312, the server 104 has completed the desired request. Therefore, the process returns to step 302 where the server 104 waits for the next request from this or any other connected client 102.

In step 310, if the response 119 is an unpaired message 116, step 314 follows. In step 314, the process determines whether a data structure for storing the unpaired messages 116 exists. If not, then a data structure is configured to store unpaired messages 116 in the appropriate order. This data structure is referenced as an unpaired message queue 122. In alternative embodiments of the present invention, the unpaired message queues 122 and/or paired message queues 120 may relate to each individually connected client 102. Alternatively, the message queues 120 and/or 122 may store and service messages for all connected clients 102. Steps 316 and 314 both then lead to step 318, where the unpaired message 116 is stored in the unpaired message queue 122.

Following step 318 the server 104 has completed the desired process. Therefore, the process returns to step 302 where the server 104 waits for the next request from this or any other connected client 102. The result is a process which ensures that all connected clients 102 may receive both paired messages 114 and unpaired messages 116 intended for the client 102.

A primary advantage of the present invention is that none of the clients 102 which now exist or will exist need to change their configurations. The present invention allows clients 102 which want to use this process implement some simple logic to request that the server 104 use the process and simple logic for handling the existence of unpaired messages 116 on the server 104. The decision to use the present invention may lie with the client 102 rather than the server 104. The present invention allows clients 102 which have logic to handle lost connections and unpaired messages 116 to continue to use the server's 104 services. Such clients 102 would not experience delays in receiving a response which use of the process of the present invention would present. The present invention allows very 'thin' or small clients 102 which operate more easily on portable computing devices to use the process of the present invention. Additionally, the present invention may utilize some of the same resources of the server 104 to manage the identification, storage, and delivery of the unpaired messages 116 which are currently used to manage paired messages 114.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer program product comprising a tangible computer useable medium having stored thereon computer executable instructions for performing a method for ensuring client access to unpaired messages from a database management system (DBMS) server, the computer useable medium operable as part of a memory device, the instructions performing the method comprising:

the DBMS server determining that a transaction response message is an unpaired message in response to a communication disruption between a client and the DBMS server, the DBMS server comprising a memory device and storing the unpaired message in an unpaired message queue, the unpaired message corresponding to a specific client, the transaction response message associated with a transaction request;

creating the unpaired message queue in the DBMS server separate from a paired message queue in response to determining a transaction response message is an unpaired message, the unpaired message queue configured to store a plurality of unpaired messages intended for a client, the unpaired message queue and paired message queue storing messages according to a First-In-First-Out protocol; and communicating transaction requests and transaction responses using an Open Transaction Manager Access (OTMA) protocol which allows the client to request at least one unpaired message stored in the unpaired message queue.

2. The computer program product of claim 1, wherein the method further comprising the DBMS server dynamically creating the unpaired message queue in response to the DBMS server detecting at least one unpaired message.

3. The computer program product of claim 1, wherein the method further comprises notifying the DBMS server of a client request to enable dynamic creation of the unpaired message queue.

4. The computer program product of claim 3, wherein notifying the DBMS server occurs during establishment of communications between the client and the DBMS sever.

5. The computer program product claim 1, wherein the method further comprises the DBMS server notifying the client when the unpaired message queue contains an unpaired message.

6. The computer program product of claim 1, wherein the method further comprises:

generating a request message to be sent from the client to the DBMS server;

storing an indicator in the request message to enable the client to distinguish between unpaired messages.

7. The computer program product of claim 1, wherein utilizing the protocol further comprises allowing the client to request automatic transmission of unpaired messages stored in the unpaired message queue.

8. A system for ensuring client access to unpaired messages from a database management system (DBMS) server comprising:

a DBMS server comprising a memory and a processor;
a client;
a request module configured to receive a client request;
a response generator which receives the client request from the request module and generates an appropriate transaction response message generated based on the client request, the transaction response message associated with a transaction request;
an unpaired message module that determines that the transaction response message is an unpaired message in response to a communication disruption between a client and the DBMS server and to store paired messages in a paired response data structure and unpaired messages in an unpaired response data structure in response to determining a transaction response message is an unpaired message, the at least one unpaired message comprising a communication response for a specific client, the unpaired response data structure and paired response data structure storing messages according to a First-In-First-Out protocol; and
a response module which communicates paired messages and unpaired messages to a client configure with simple communication logic that conforms to an Open Transaction Manager Access (OTMA) protocol such that the client constitutes a thin client.

9. The system of claim 8, wherein the unpaired message module is further configured to dynamically create the unpaired response data structure in response to a first unpaired response message.

10. The system of claim 8, wherein the response module is configured to automatically send all unpaired messages stored in the unpaired response data structure.

11. The system of claim 8, wherein the response module is configured to send all unpaired messages stored in the unpaired response data structure in response to a request from the client.

12. The system of claim 8, wherein the system is activated upon the DBMS server receiving an activation request from the client.

13. The system of claim 8, wherein the response module notifies the client when the unpaired response data structure contains at least one unpaired message.

* * * * *